Figure 1:
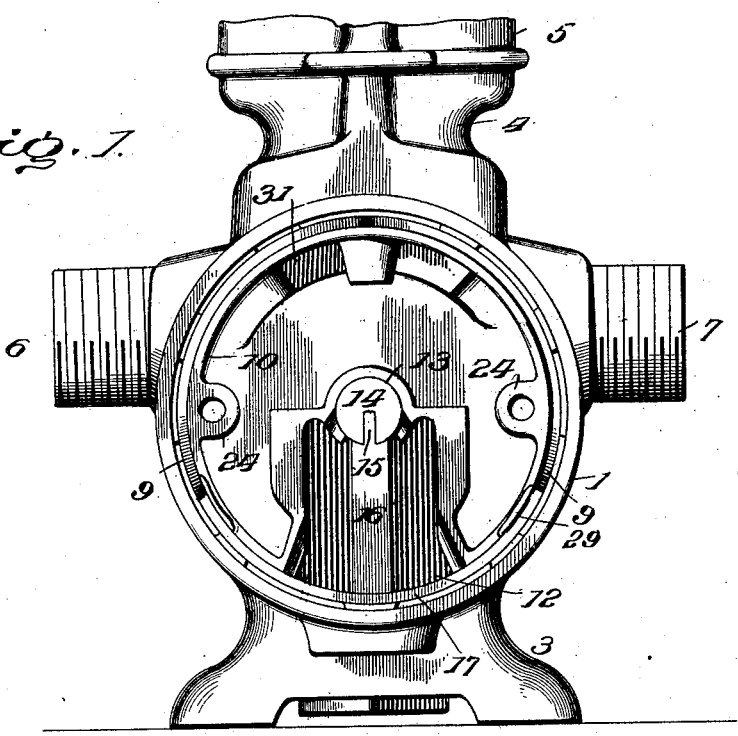

No. 711,192. Patented Oct. 14, 1902.
J. C. ANDERSON.
LIQUID METER.
(Application filed Mar. 10, 1902.)
(No Model.) 10 Sheets—Sheet 1.

WITNESSES: INVENTOR
Jas. C. Anderson
BY
Attorney

No. 711,192. Patented Oct. 14, 1902.
J. C. ANDERSON.
LIQUID METER.
(Application filed Mar. 10, 1902.)
(No Model.) 10 Sheets—Sheet 3.

WITNESSES: INVENTOR
Jas. C. Anderson
BY
Attorney

No. 711,192. Patented Oct. 14, 1902.
J. C. ANDERSON.
LIQUID METER.
(Application filed Mar. 10, 1902.)
(No Model.) 10 Sheets—Sheet 5.

WITNESSES: INVENTOR
Jas. C. Anderson
BY
Attorney

No. 711,192.  
J. C. ANDERSON.  
LIQUID METER.  
(Application filed Mar. 10, 1902.)

Patented Oct. 14, 1902.

(No Model.)

Witnesses  
Jas. C. Anderson, Inventor

Attorney

No. 711,192. Patented Oct. 14, 1902.
J. C. ANDERSON.
LIQUID METER.
(Application filed Mar. 10, 1902.)

(No Model.) 10 Sheets—Sheet 8.

Witnesses
Inventor
Jas. C. Anderson
By
Attorney

No. 711,192. Patented Oct. 14, 1902.
J. C. ANDERSON.
LIQUID METER.
(Application filed Mar. 10, 1902.)
(No Model.) 10 Sheets—Sheet 9.
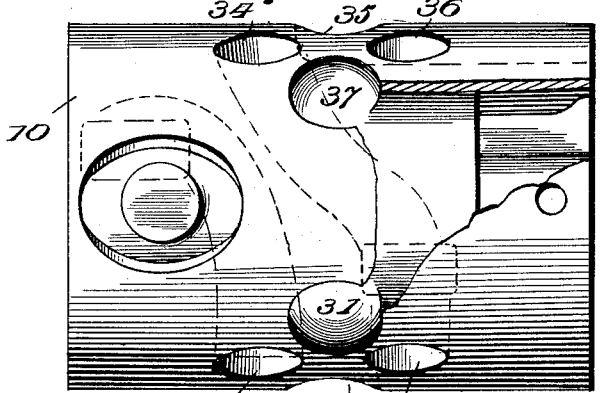
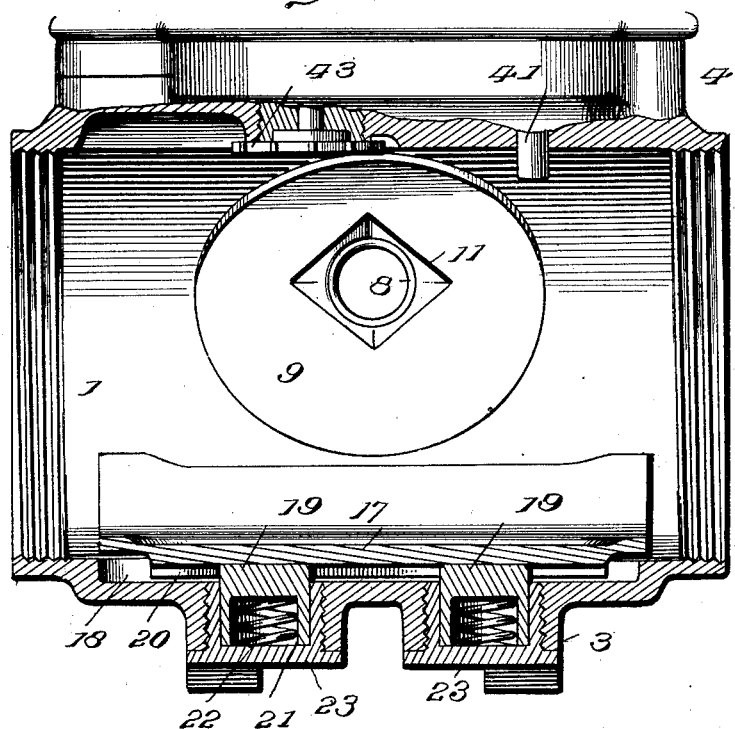

No. 711,192. Patented Oct. 14, 1902.
J. C. ANDERSON.
LIQUID METER.
(Application filed Mar. 10, 1902.)
(No Model.) 10 Sheets—Sheet 10.
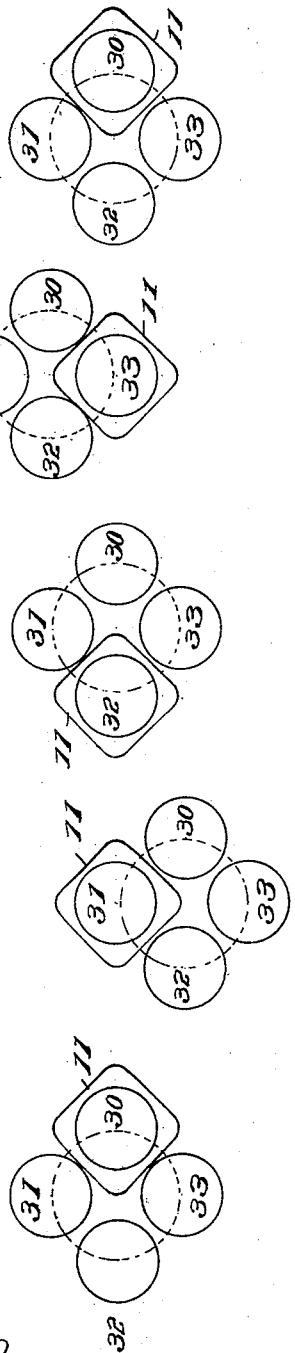
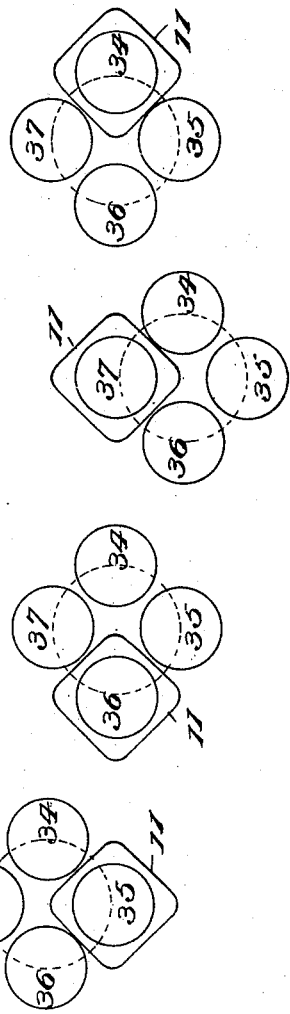

UNITED STATES PATENT OFFICE.

JAMES C. ANDERSON, OF HIGHLAND PARK, ILLINOIS.

LIQUID-METER.

SPECIFICATION forming part of Letters Patent No. 711,192, dated October 14, 1902.

Application filed March 10, 1902. Serial No. 97,718. (No model.)

*To all whom it may concern:*

Be it known that I, JAMES C. ANDERSON, a citizen of the United States, residing at Highland Park, in the county of Lake and State of Illinois, have invented certain new and useful Improvements in Liquid-Meters; and I do hereby declare the following to be a full, clear, and exact description of the invention, such as will enable others skilled in the art to which it appertains to make and use the same.

My invention relates to certain new and useful improvements in liquid-meters of that class shown and described in Letters Patent No. 688,378, granted to me December 10, 1901, and in which is employed a single reciprocating and oscillating piston provided with ports leading through said piston and adapted to register with the inlet and outlet ports or conduits of the casing. In the meter described in said patent the piston is provided with a radial wing inclosed within a longitudinally-movable valve-box mounted upon the periphery of the piston and located within the tapering side walls and vertical end walls of an upwardly-projecting portion of the casing, suitable channels and ports being provided for the inlet and exhaust of the liquid and whereby oscillating motion is imparted to the piston during its longitudinal or reciprocating movements. For a more detailed description of said meter reference is made to the Letters Patent above referred to.

My present invention has for its object to simplify the construction referred to and to dispense entirely with any radial projection on the casing and all means beyond the periphery of the piston for producing the oscillation of the same.

My invention has for a further object to reduce the area of wearing-surfaces to the minimum and to provide automatic adjustment of said surfaces under and through the medium of the liquid-pressure.

My invention has for a further object the making of the parts which constitute the wearing-surfaces readily removable and interchangeable, whereby repairs may be readily and economically made.

My invention has for a further object providing details of construction whereby readily-renewable parts may be sundered to relieve the main structure when excessive strain is exerted by the freezing action during excessively cold temperatures.

With these ends in view my invention consists of a casing and a longitudinally-movable piston provided with a segmental longitudinal channel and a radial wing, the latter pivotally arranged within the longitudinal axis of the piston and having its outer edge located within a longitudinal seat in the meter-casing and suitable inlet and outlet passages in the casing and inlet and exhaust ports in the piston, whereby the transit of liquid through the meter will cause the piston to reciprocate within the casing and oscillate upon its jointure or pivotal connection with the wing, and thereby accurately measure and cause to be recorded the amount of liquid passing through the meter, all as will be hereinafter and more fully described.

My invention consists, further, in the details of construction and arrangement hereinafter more fully described and specifically claimed.

In order that those skilled in the art to which my invention appertains may know how to make my improved meter and fully understand its operation, I will proceed to describe the same, referring by numerals to the accompanying drawings, in which—

Figure 2:
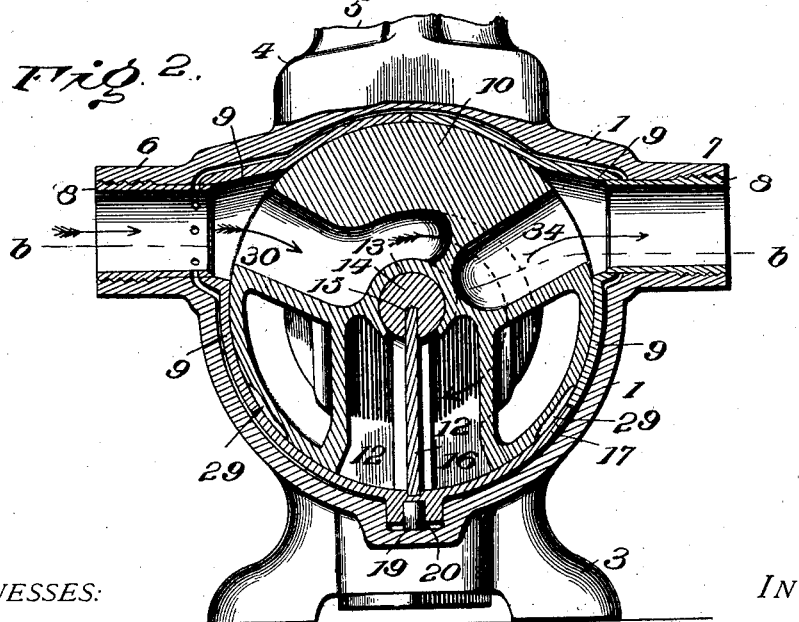
Figure 3:
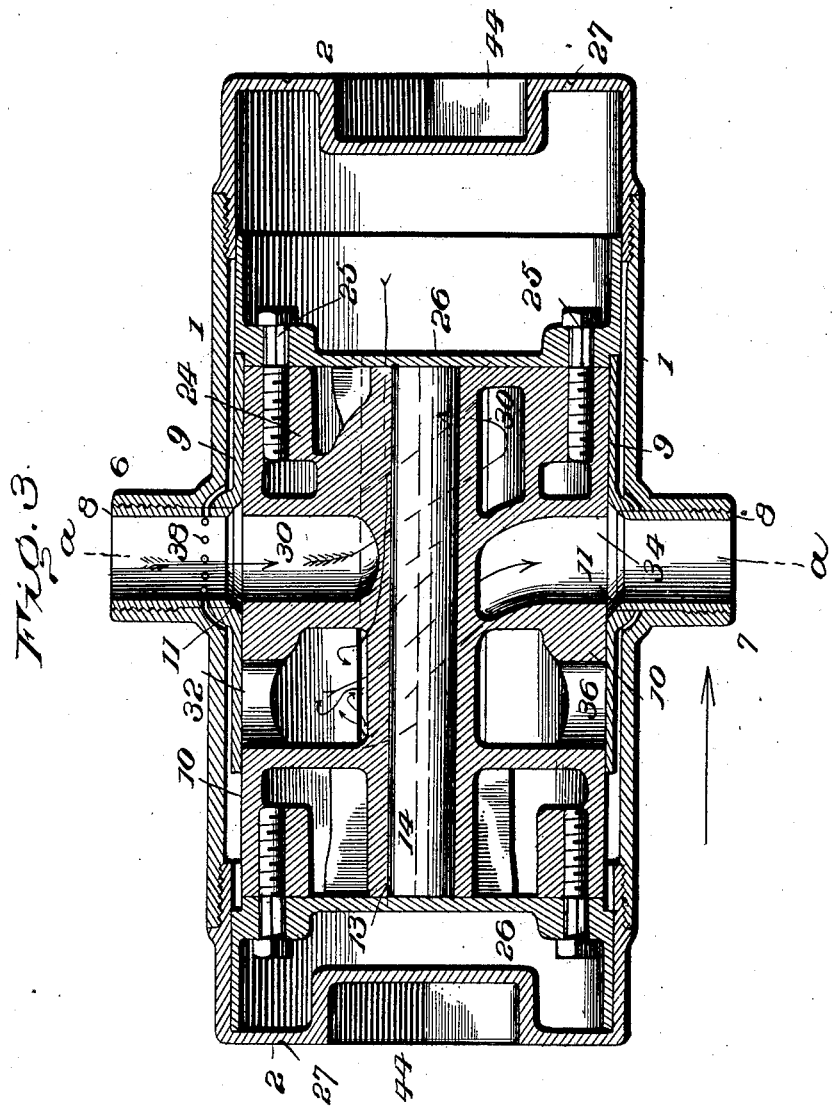
Figure 4:
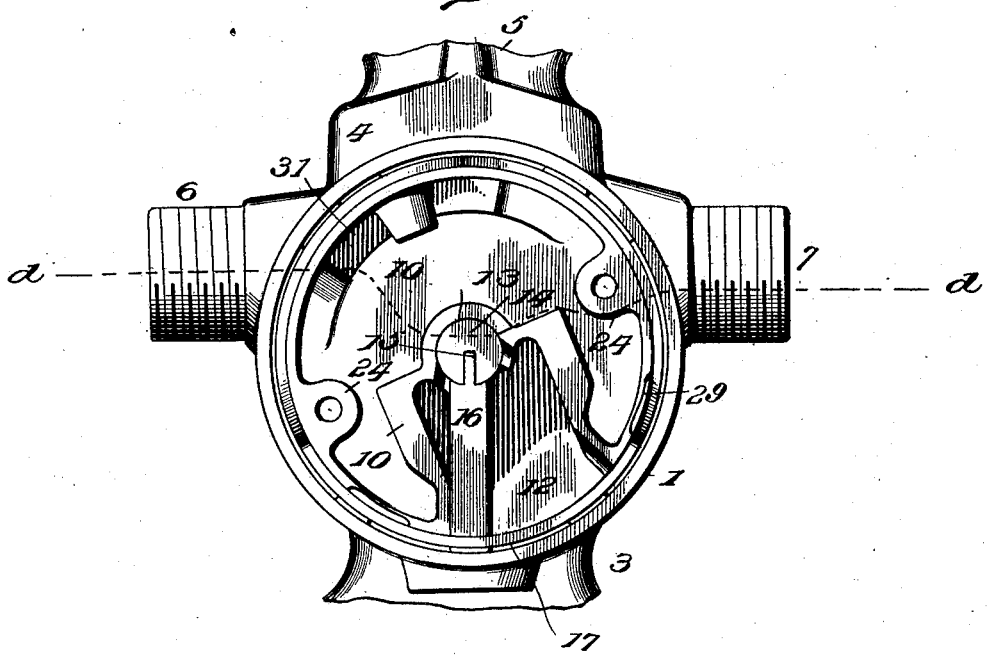
Figure 5:
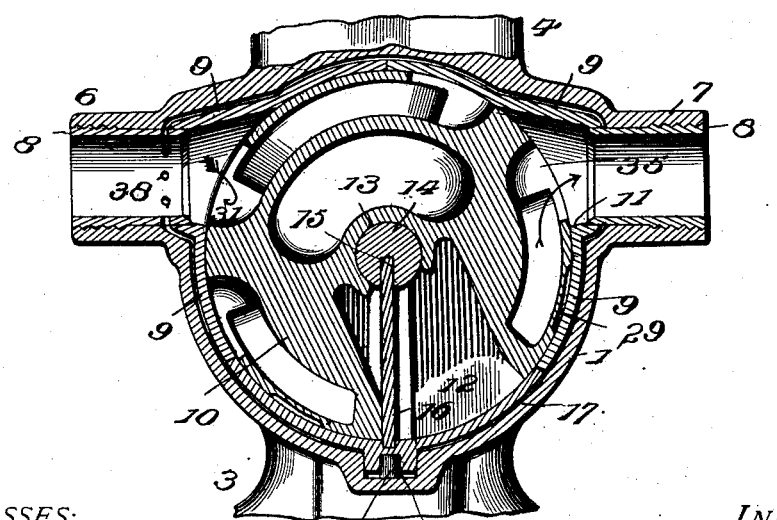
Figure 6:
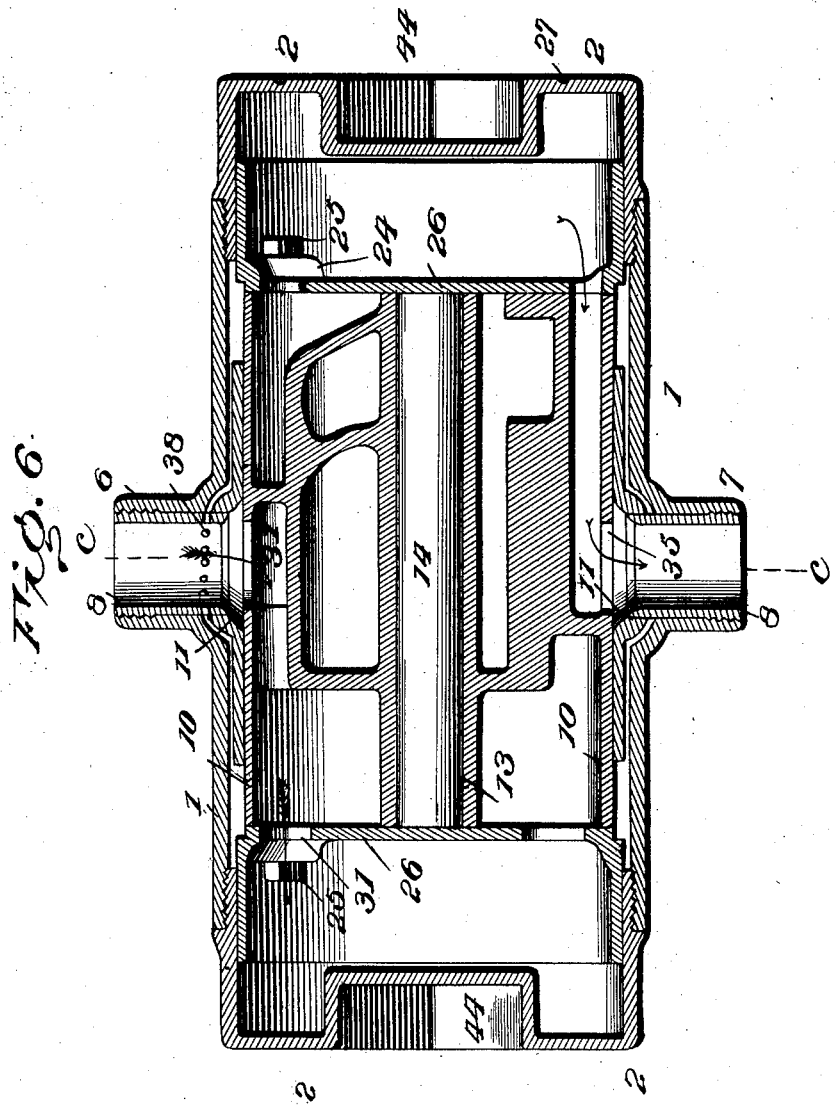
Figure 7:
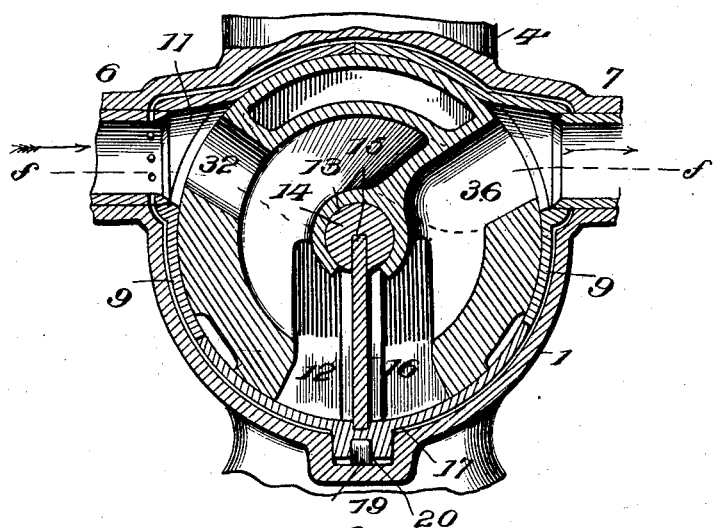
Figure 8:
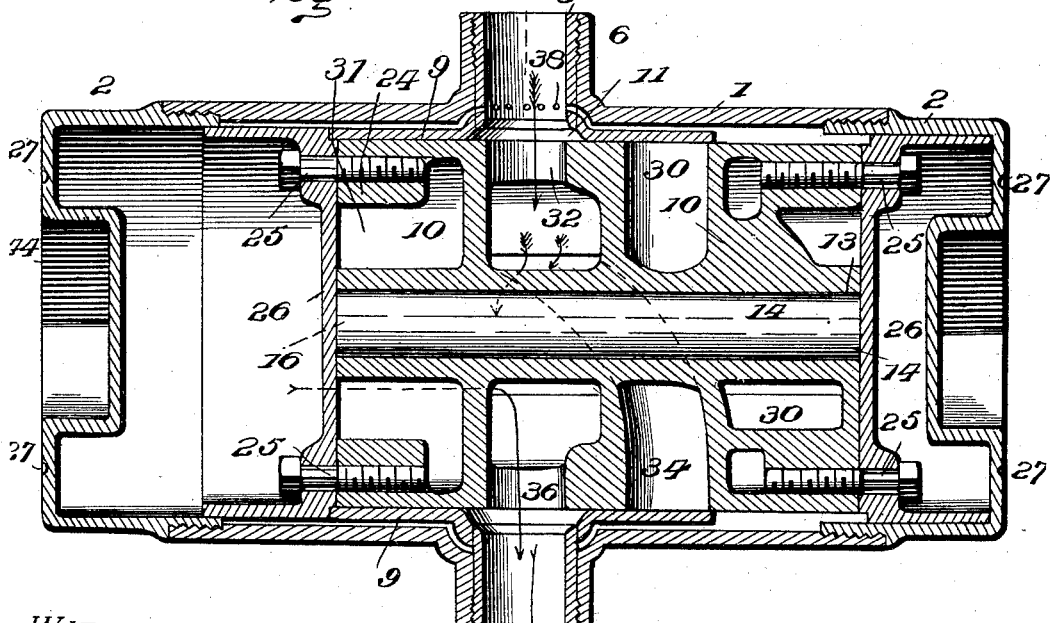
Figure 11:
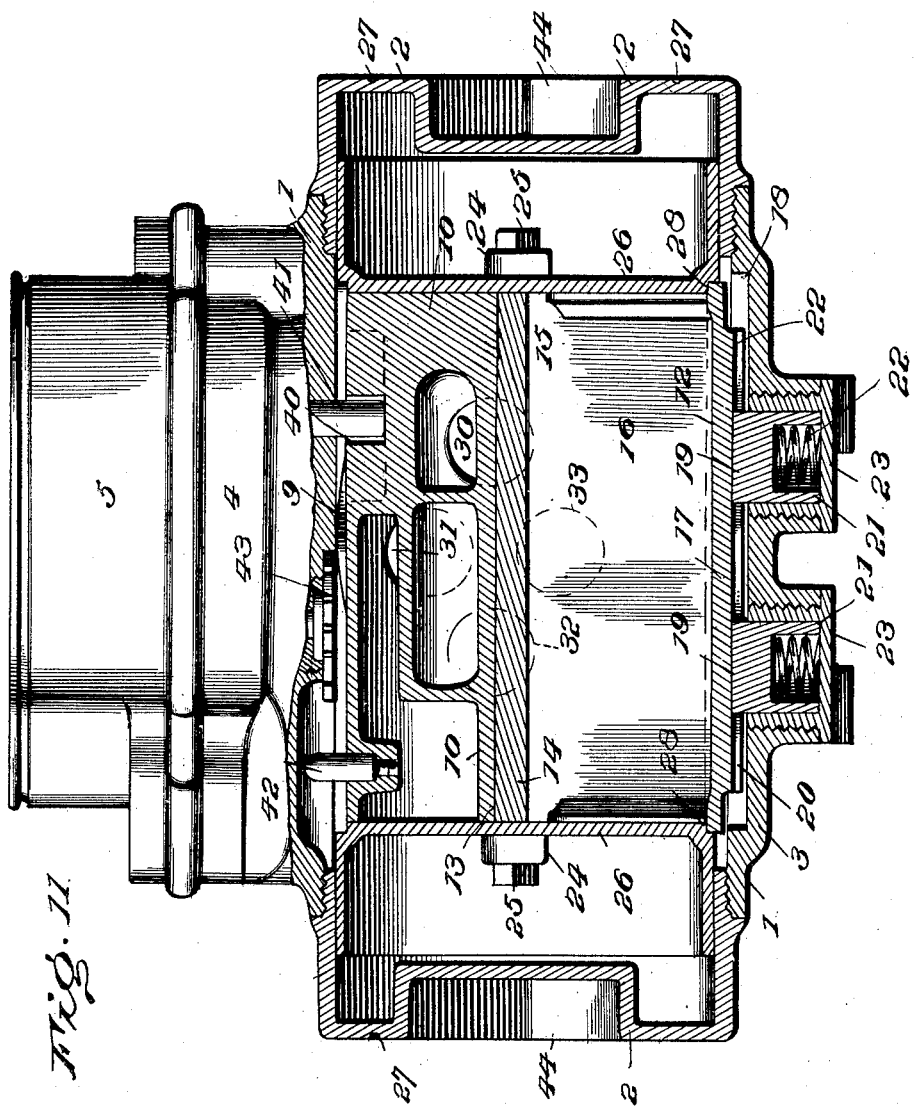
Figure 12:
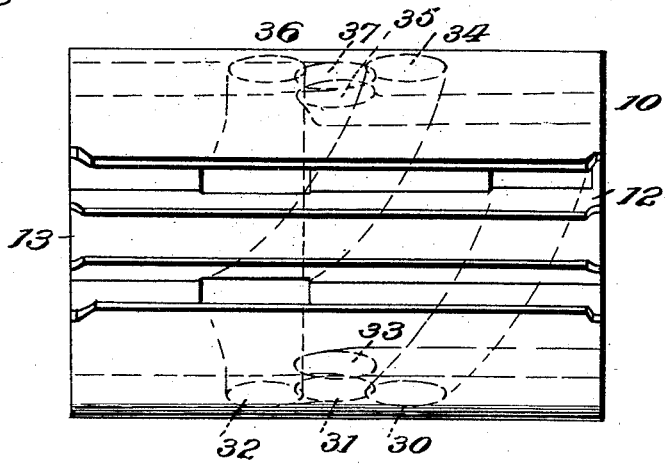
Figure 13:
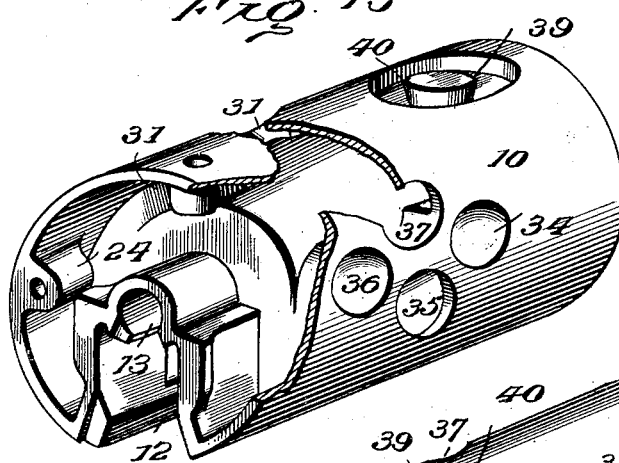
Figure 14:
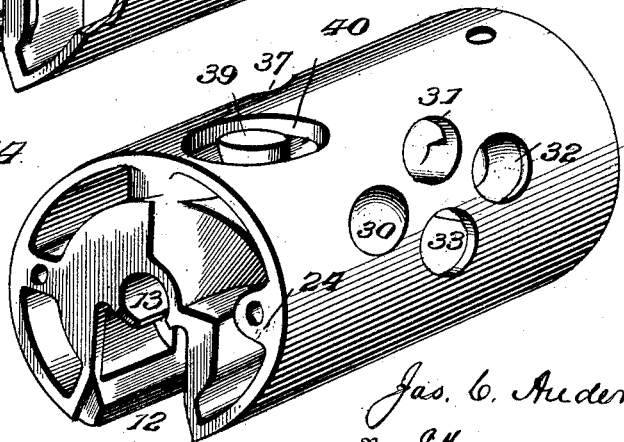

Figure 1 is an end view with the near cap-plate or head removed and exposing the piston located at the nearest end of the cylinder and in its initial position. Fig. 2 is a transverse section on the line *a a* of Fig. 3. Fig. 3 is a horizontal section of the same on the line *b b* of Fig. 2. Fig. 4 is a view similar to Fig. 1, but showing the piston in its position after having made half its stroke in one direction. Fig. 5 is a transverse section on the line *c c* of Fig. 6. Fig. 6 is a horizontal section on the line *d d* of Fig. 4. Fig. 7 is a transverse section on the line *e e* of Fig. 8 and showing the piston at the extreme end of the first half-stroke opposite to that shown in Fig. 1. Fig. 8 is a horizontal section on the line *f f* of Fig. 7. Fig. 9 is a transverse section on the line *g g* of Fig. 10 and showing the position of the piston at a half-stroke on its return toward the position shown at Fig. 1. Fig. 10 is a horizontal section on the line *h h* of Fig. 9. Fig. 11 is a longitudinal section on the line *i i* of Fig. 9, the piston being in the same position. Fig. 12 is a bottom plan view of the piston, showing in dotted lines the trend of the several parts therein. Fig. 13 is a detail perspective view of the piston looking toward the end shown at Fig. 1. Fig. 14 is a detail perspective view of the piston looking toward the end opposite to that shown at Fig. 13. Fig. 15 is a top plan view of the piston with parts broken away. Fig. 16 is a longitudinal section of the cylinder or casing, showing in elevation the bottom semicylindrical bearing-plate and one of the cut-off plates. Figs. 17 to 26 are diagrammatic views showing the manner in which the ports in the piston are successively brought into register with the ports in the cut-off plates, located, respectively, between the inlet and the outlet conduit-pipes.

Similar numerals indicate like parts in the several figures of the drawings.

1 represents the cylindrical portion of the casing, the ends of which are closed by screw-caps 2, as clearly shown at Figs. 3, 6, 8, 10, and 11, and which are screwed into the ends of the cylindrical portion 1 of the case.

3 is the base of the casing, and 4 is the upper portion of the same, upon which is securely mounted the box or casing 5, within which is located the registering mechanism.

6 is the inlet-nipple, and 7 the outlet-nipple, of the casing, which are provided with exterior threads, as shown at Fig. 1, for connection with the service-pipes. (Not shown.)

Within the inlet and outlet nipples 6 and 7 are located tubes 8, the outer ends of which are threaded and screwed into the nipples 6 and 7, and the inner ends projecting a short distance within the casing 1 and adapted to fit within the circular openings of cut-off plates 9, which, as shown, are adapted to constitute bearing-surfaces for the reciprocating and oscillating piston 10.

As shown at Fig. 16, the cut-off plates 9 have the circular opening, which fits over the tubes 8, merging or terminating in a rectangular opening 11, so that the several ports of the piston may be brought into register therewith during the reciprocating and oscillating movements of the piston, as indicated by the diagrammatic Figs. 17 to 26 and as will be hereinafter described.

The piston 10 is cylindrical in form and is provided with a radial or segmental channel 12, extending from end to end, and with an axial cylindrical pocket or recess 13, (see Figs. 13 and 14,) adapted to receive a cylindrical longitudinal key 14, which has a longitudinal kerf or slot to receive a tenon or feather 15 on one edge of a wing 16, the opposite edge of which is located in a longitudinal pocket or seat in a semicylindrical bearing-plate 17, upon which the piston 10 is supported, as clearly shown in the several figures of the drawings representing transverse sections.

The casing 1 is formed with a longitudinal channel 18, in which are located near each end guide studs or pins 19, which enter a longitudinal groove 20 (see particularly Fig. 11) in the under side of the plate 17. These studs or pins represent cords of the cylindrical base portion 21, which is formed with a pocket, in which spiral springs 22 are located, which are designed to overcome simply the gravity of the plate 17 in order that the normal relations between the said plate and the piston shall be always maintained as the surfaces may become worn and so that the liquid-pressure hereinafter referred to may operate to hold the said plate in proper water-tight working relation with the piston. These pins or studs are, as clearly shown, seated within screw-threaded plugs 23, which close corresponding openings in the bottom of the case 1, and by this form of construction the parts may be readily located and assembled.

The piston 1 is provided at each end with lugs 24, tapped to receive the screws 25, by means of which the removable heads 26 of the piston are secured in place upon said piston. These heads 26, as clearly shown in the several longitudinal sectional figures of the drawings, are slightly greater in diameter than the remaining or body portion of the piston, and hence constitute limited frictional and wearing surfaces in contact with the casing 1, thus also reducing the resistance to the reciprocating and oscillating movements of the piston.

The screws 25 are made predeterminedly weaker near the head portion, as clearly shown in the drawings, in order that should the liquid in the meter freeze under low temperatures the necessary expansion of such liquid will cause the heads of the screws to strip off, thus permitting either or both of the heads 26 to part from the body of the piston, and thus prevent damage otherwise to the meter as a whole.

The caps 2 of the casing are made predeterminedly weaker at a given locality by a circular groove 27 in order that under conditions of freezing above referred to these caps will also be ruptured.

The screws 25 are made with a reduced square body portion, as clearly shown, near the head for producing the referred-to weak portion, and the heads 26, where the screws pass through the same, are formed with a space around the square portion of the screws 25 in order that a suitable tool may be used to back out that portion of the screw left in the lugs 24.

From the description given of the general and specific manner of securing the heads 26 and the cylinder-caps 2 in position it will be seen that said parts may be readily restored in place or economically renewed under all conditions.

From the description thus far given and without reference to the causes which operate to give to the piston its reciprocating and oscillating movements, which will be presently described, it will be seen that in the reciprocating movements the bearing-surfaces consist of the exteriors of the piston-heads 26 and the interior surfaces of the caps 2 of the cylinder 1 and the groove 20 of the semi-cylindrical plate 17 and the studs or pins 19, the plate 17 being held in fixed longitudinal relation with the piston between the heads 26, as clearly shown at Fig. 11. During the oscillating movements of the piston the contact-surfaces are the heads 26 and cylinder-caps 2 and between the cylindrical body of the piston 10 and the semicylindrical plate 17. The inner ends of the heads 26 being reduced to the same diameter as the body of the piston and constituting a seat, as shown at 28, Fig. 11, for the ends of the plate 17, a limited bearing-surface also exists at such locality during the oscillatory movement of the piston.

For the purposes to be hereinafter explained the periphery of the piston 10 is formed with longitudinal recesses 29. (See particularly the figures representing transverse sections.)

I will now proceed to describe the several ports in the piston 10, and in doing so I shall refer to the arrows employed to indicate the movement of the liquid through said ports, those arrows shown with a feathered butt indicating the inlet and those with plain or V-shaped butt indicating the outlet or exhaust movements of the liquid.

In following out the construction of the various parts and the trend of the liquid attention is directed to the serial order of the figures of the drawings, which, as heretofore stated in the description of the several figures, indicate the relation and position of the parts as they appear in the progressive movements thereof.

Looking now and particularly to Figs. 1 and 2, the piston is shown at the nearest end of the cylinder and in what may be denominated the "initial" position. In such position the liquid enters the inlet 6 and passing through the tube 8 and circular part of the port through the cut-off 9 moves outwardly or laterally into the rectangular portion 11 of said port and passes into the port 30 of the piston and traverses said port in a circular trend and into the longitudinal or segmental channel 12 and against the wing 16, as indicated by the course of the feathered arrow shown at Fig. 2, and as the wing is held against oscillation by its lower edge, located within its longitudinal seat in the plate 17, the pressure of the liquid is exerted against the radial wall of the segmental channel 12, which causes the piston to oscillate upon the cylindrical key 14. This oscillation of the piston causes the port 31 of the piston to begin register with the rectangular enlargement of the port through the cut-off 9, and said port 31 trends longitudinally and out through the near head of the piston, as illustrated by the feathered arrow at Fig. 6, so that the liquid-pressure is exerted between the cap 2 of the cylinder and the near head 26 of the piston obviously causes said piston to move longitudinally in the direction indicated by the arrow below Fig. 3. During this movement of the piston the port 30 is still in register with the cut-off inlet-port, and consequently the piston is oscillated until it has completed one-half of its reciprocating movement toward the far end, or one-fourth of what is understood as a full piston-stroke, and reached the position illustrated at Figs. 4 and 5. The liquid passing through the port 31 causes the piston to continue its reciprocating movement, and this movement brings the port 32 into register with the inlet cut-off port 11, and the liquid then also travels circumferentially through said port to the opposite side of the wing 12, thus oscillating the piston in a direction opposite to that just described, which oscillation is continued until the piston has completed its initial stroke toward the far end, at which time such oscillation of the piston has caused the port 33 to begin register with the inlet-port 11 of the cut-off, and the liquid then also travels through said port 33 between the piston-head 25 and cap 2 of the cylinder at the far end and as indicated by the feathered arrow at Fig. 10, which causes the piston to begin its return reciprocating movement, Fig. 9 illustrating the position at one-half of the return stroke, or in the reverse position to that shown at Fig. 5. The continued longitudinal movement of the piston under the pressure exerted by the fluid through port 33 brings again port 30 gradually into register with inlet cut-off port 11, which admits the liquid again to the initial side of the wing 12, causing the piston during its completion of the return stroke to be oscillated into its initial position, as shown at Figs. 1 and 2, ready to again begin the movements described.

The ports of the piston 10 which have thus far been described have their entry or inlets on that side of the piston next to the inlet-nipple 6 of the casing 1. On the other side of the piston, diametrically opposite the ports 30, 31, 32, and 33, are ports 34, 35, 36, and 37, which I term "exhaust-ports," and by following the trend in the several figures of the arrows with solid or V-shaped butts it will be readily seen that the liquid which enters the inlet-nipple 6 finally escapes to the outlet-nipple 7 and its service-pipe connection. Keeping in mind the movement of the liquid as already described and assuming that the piston has completed a full half-stroke and reached the position illustrated in Figs. 7 and 8, I will now explain more in detail how the liquid reaches the exit-nipple 7 and its service connection. In this position the inflowing liquid, as already described, passing to the left of the wing 16, causes the piston to oscillate toward the right and just at this moment the circumferential exhaust-port 36 is rolled into partial register with the exhaust-port 11 of the cut-off 9 diametrically opposite to the similar inlet cut-off on the other side, and as the port 36 communicates with the segmental channel 12 on the right of the wing 16 the liquid at that locality is obviously expelled by the oscillating movement of the piston 10, and the liquid necessarily escapes through the tube 8 and nipple 7. At the same time the port 37, which communicates longitudinally with the space between the cap 2 and piston-head 26 at the near end, is gradually brought into register with the exhaust-port of the cut-off on the right-hand side, and the longitudinal movement of the piston expels the liquid contained between the cap and piston-head through the exhaust cut-off port and through the tube 8 and nipple 7. The continued movement of the piston, as already described, causes the liquid to again enter on the right-hand side of the wing 16, and the liquid then on the left-hand side of said wing is expelled through the circumferential exhaust-port 34, which communicates with the channel 12 on that side of the wing and which has been brought into register with the exit or exhaust port of the cut-off on the right-hand side of the piston and cylinder, and hence said liquid is caused to travel through the exit-nipple, and, as under the action described, the piston again moves from the near end toward the far end, the liquid between the far-end head 26 and cap 2 is expelled through the longitudinally-trending exhaust-port 35, and the liquid on the left of the wing 16 is expelled through the circumferential port 36. It will thus be seen that the action of the meter is continuous and that the liquid entering the nipple connection 6 is practically divided into four different currents, which are again converged in the outlet-nipple connection 7, and I have found from practical experiment and observation that this original subdivision of the inflowing column of liquid is so well defined that the converging column on its exit from the nipple clearly manifests the independent spheres of motion, or, in others words, that the column of liquid, although merged, shows four distinct axial motions.

In order that the positions of the several inlet and outlet or exhaust ports of the piston during the several oscillatory and reciprocating movements of the same may be better understood, reference is especially made to the diagrammatic figures of the drawings. Fig. 17 illustrates the relation of the inlet-ports of the piston to the port 11 of the inlet cut-off when the piston is in its initial position, as already described. Fig. 18 illustrates the relation when the piston has made a one-fourth stroke or reached one-half the distance toward the far end, and Fig. 19 illustrates the relation when the piston has completed a one-half stroke or reached the far end. Fig. 20 illustrates the relation at the three-quarter stroke or when the piston has returned one-half the distance toward the near end; Fig. 21, the relation when the piston has returned to its initial pistion and completed a full stroke.

Figs. 22, 23, 24, 25, and 26 illustrate in serial order the relation of the outlet or exhaust ports of the piston to the port 11 of the exhaust or outlet cut-off 9 in the same order as has been described with reference to the inlet-ports, so that it will be seen that the liquid which enters the inlet-nipple 6 to produce the oscillation and reciprocation of the piston is free to be expelled through the outlet or exhaust ports on the opposite side of the piston without interruption. From this condition it necessarily follows that my improved meter is of necessity self-cleaning and that any foreign substance held in suspension in the liquid—such, for instance, (where water is passed through the meter,) as silt or small fish—will be fully cut up or disintegrated to such extent as to relieve the meter from all obstruction and consequent stoppage of its operation.

The two diametric cut-offs 9, as clearly shown, are secured in position upon the inner ends of the tubes 8 by a slip connection, and, as seen at 38, the tube 8 on the inlet side has radial perforations behind the extreme outer movement of the cut-off in its slip movement, so that the liquid under pressure is free to travel between the cylinder and the cut-off and hold the latter in close and water-tight relation with the moving piston 10, thus compensating also for any wear which may take place. The liquid passing through the radial orifices 38 passes also between the semicylindric plate 17 and the cylinder 1 and holds the former in water-tight relation with the piston and compensates for wear.

The piston 10 is provided on the upper surface near the far end with a radial and undercut stud 39, (see Figs. 13 and 14,) surrounded by a circular race 40, and a pin or stud 41, projecting vertically from the upper portion 4 of the case, enters the race 40, and in the reciprocating and oscillating movements of the piston the stud 39 travels around the stud 41, and the latter thus limits the movements of the piston. Secured within the periphery of the piston and near the end opposite to that at which are located the stud 39 and race 40 is secured a radial stud or tappet 42, which is threaded into a suitable boss on the cylinder 1, and this tappet once during each full stroke of the piston contacts with a spur-wheel 43 on the lower end of the vertical shaft of the primary gear of the registering mechanism located within the register-box or casing 5, and hence as each full stroke of the piston is made and a measured quantity of liquid is thus passed through the meter a record is made thereof by the registering mechanism.

It will be noted that but a single piston is employed and that there are no dead-centers, owing to the fact that under the peculiar and described movements of the piston the inlet and exhaust ports on the opposite sides of the piston bear such relation to the inlet and outlet service connections that both a circumferential and longitudinal port on each side of the piston are to a greater or less extent, respectively, in register with the inlet and outlet nipple or service connection.

In order to provide for the equalization of the pressure contact between the cut-off plates 9 and supporting-plate 17 with the piston 10, the periphery of the latter is formed with recesses 29, as shown in the transverse sections of the drawings, so that the area of the peripheral surfaces of said piston when in moving contact with the said cut-off and supporting-plates will be such that the exterior pressure will predominate to only such a degree as to secure proper contact to avoid leakage and at the same time prevent unnecessary frictional and wearing contact.

The registering mechanism proper is located within the top 5 of the casing, which is provided with a glass cover in order that the meter may be read. The shaft of the primary gear 43 is suitably packed to make a watertight joint between it and the bottom of the register containing top 5, and the stud 41, which passes through the upper part of the casing 1 and which is threaded therein rigidly, is properly sealed at its upper end after it has been duly adjusted to position relatively with the stud 39 and race 40 on the periphery of the piston.

The ends or faces of the cylinder-caps 2 are formed with a countersunk recess 44 to receive a suitable wrench for manipulating said heads in putting them in place or removing the same, and as the heads 26 of the piston are hollow, as shown, the countersunk recesses do not interfere with the movements of the piston, and I am thus enabled to reduce the length of the meter and the weight of the same below that which would be necessary if exterior provision were provided for the use of a wrench.

From the construction and operation of my improved meter it will be obvious that the tappet 42 contacts with the spur-gear 43 but once during every full stroke of the meter, and hence the registering mechanism during each of said full strokes accurately records the liquid passed through the meter and according to its predetermined capacity. The stud 41, which enters the race 40, surrounding the stud 39 in the periphery of the piston 10, locks the same against withdrawal from the cylinder until the stud 41 is backed out of the race, and consequently with the piston so locked within the cylinder the spur-wheel 43 cannot be reached or tampered with to alter the record made by the registering mechanism, which under such circumstances could only be reached for such a purpose by removing the top portion 5, which contains the registering mechanism. To prevent such removal of the portion 5 of the meter, I provide special locking mechanism which is adapted to and coöperates with the details of construction of the meter, and such locking devices constitute the subject-matter of another application filed by me concurrently herewith and bearing Serial No. 97,717.

Many changes may be made in mere details of construction, design, and proportions of the several parts of my improved meter without departing from the spirit of my invention.

Having described the construction, operation, and advantages of my invention, what I claim as new, and desire to secure by Letters Patent, is—

1. A liquid-meter embodying in its organization a casing provided with inlet and outlet connections or passages, a piston located within said casing and provided with circumferential and longitudinal ports as described, a segmental channel extending from end to end of the piston and closed at its ends by the heads of the piston; a wing or partition located within the segmental channel and bridging the space between the under side of the piston and casing and connected to the casing and piston so as to partake of only one of the movements of the latter; registering mechanism located within the casing and means intermediate of the piston and the registering mechanism, for operating the latter, substantially as hereinbefore set forth.

2. A liquid-meter consisting of a case provided with inlet and exit connections, a reciprocating and oscillatory piston located within said case, and provided with a segmental channel and with two peripheral inlet-ports leading to and through the opposite walls of the segmental channel, and two peripheral ports leading to opposite ends of the piston, corresponding outlet or exhaust ports on the opposite side of the piston and reversely arranged relatively with the inlet-ports, a non-oscillating wing or partition located within the segmental channel of the piston and means intermediate of one edge of said wing and the piston to constitute a journal upon which the piston is adapted to oscillate; registering mechanism within the case, and means intermediate of the reciprocating and oscillating piston and registering mechanism for operating the latter, substantially as and for the purpose set forth.

3. A liquid-meter consisting of a case provided with inlet and outlet connections, a reciprocating and oscillating piston located within said case and provided with a segmental channel and with two peripheral inlet-ports leading to and through the opposite walls of the segmental channel, two peripheral ports leading to opposite ends of the piston, and with corresponding peripheral ports on the opposite side of the piston and reversely arranged relatively with the inlet-ports; cut-offs opposite each set of piston-ports and each provided with a port of greater area than the respective peripheral ports of the piston, a non-oscillating wing or partition located within the segmental channel of the piston and means intermediate of one edge of said wing and the piston to constitute a journal upon which the piston is adapted to oscillate; registering mechanism within the case, and means intermediate of the reciprocating and oscillating piston and the registering mechanism for operating the latter, substantially as hereinbefore set forth.

4. In a meter such as described and in combination with the casing provided with cylindrical caps to close the same, a reciprocating and oscillating piston located within the casing and provided with hollow cylindrical heads greater in diameter than the remainder of the piston and adapted to fit and move within the cylindrical caps of the casing substantially as and for the purpose set forth.

5. In a meter such as described and in combination with the casing having inlet and outlet connections and provided with cylindrical caps, and a reciprocating and oscillating piston provided with hollow heads fitting within the caps of the casing and with inlet and outlet ports and a segmental channel; cut-off plates located on opposite sides of the piston and provided each with a port communicating respectively with the inlet and outlet connections of the casing; a semicylindrical supporting-plate confined between the heads of the piston and adapted to reciprocate therewith, and a non-oscillating wing or partition mounted at its lower edge within the supporting-plate and at its upper edge in a cylindrical key located axially within the piston, substantially as and for the purposes set forth.

6. In a meter such as described and in combination with the casing provided with inlet and outlet passages and a reciprocating and oscillating piston located within the casing and provided with cylindrical hollow heads of greater diameter than the remainder of the piston and with a segmental channel and ports leading from opposite sides of the piston to the segmental channel and through opposite heads of the piston, and with a radial wing located within the segmental channel and rotatively connected with the axis of the piston, ported cut-off plates located between the inlet and outlet passages of the piston and adapted to move bodily toward or from the periphery of the piston and provided with channels leading from the interior to the space between said plates and the casing, and a supporting semicylindrical plate arranged below the piston and with a space between said plate and the casing, concentric and communicating with the space between the cut-off plates and the piston whereby a part of the liquid entering the inlet-passage under pressure may act upon the exterior surfaces of the cut-off plates and supporting-plate to secure proper contact between said plates and the periphery of the piston, substantially as hereinbefore set forth.

7. In a meter such as described and in combination with the casing and the reciprocating and oscillating piston located therein and provided with the segmental channel and rotatively mounted upon a non-oscillating wing within said channel; supporting guide-pins entering a longitudinal slot in the wing-supporting plate and supported upon suitable seats within adjustable and removable screw-plugs secured in the bottom of the casing, substantially as and for the purposes set forth.

8. In a meter such as described and provided with the wing and piston-supporting plate, the guide-pins for controlling the wing and piston-supporting plate, seated in adjustable and removable screw-plugs, and provided with pockets or recesses at their base, and springs located within said pockets or recesses, substantially as and for the purpose set forth.

9. In a meter such as described and in combination with the casing or cylinder, a reciprocating and oscillating piston located therein and provided with hollow cylindrical heads of greater diameter than the remainder of the piston and removably secured thereto, whereby the frictional area between the piston and cylinder is reduced, and the wearing parts may be readily and economically renewed substantially as hereinbefore set forth.

10. In a meter such as described the reciprocating and oscillating piston provided with hollow heads secured upon the ends of the piston-body by screws, rendered predeterminedly and comparatively weak near the heads thereof, whereby the said screws may be ruptured by expansion produced by freezing of liquid contained within the meter, substantially as and for the purpose set forth.

11. In a meter such as described, the casing or cylinder provided with caps for closing the ends thereof, said caps rendered predeterminedly weak by depressions or grooves in their disk-faces between their centers and circumference, substantially as and for the purpose set forth.

12. In a meter such as described, in combination with the casing or cylinder having inlet and exit connections, and an oscillating and reciprocating piston located therein and provided with peripheral inlet and exhaust ports and a radial channel such as described; a non-oscillating wing or partition located within the radial channel of the piston, said piston having oscillatory movement with relation to said wing, substantially as and for the purposes set forth.

13. In a meter such as described the piston 10, provided with removable cylindrical heads, having each two ports therethrough, a pair of peripheral ports on each side of said piston leading circumferentially and reversely to and through the opposite walls of a segmental channel, and a pair of peripheral ports on each side leading reversely to the ports through the heads of the piston, substantially as and for the purposes set forth.

14. In a meter such as described a piston having closed heads with longitudinal ports therethrough, and segmental channel closed at each end, peripheral ports on each side of the piston and leading reversely to and through the opposite walls of the segmental channel, two peripheral ports on each side leading to the ports through the heads, and means axially arranged for oscillatory connection with a non-oscillating wing located within the segmental channel and confined between the heads, substantially as hereinbefore set forth.

15. In a meter such as described the piston formed with a cylindrical body, having screw-threaded lugs 24 at each end and hollow heads 26 secured in position by screws 25, substantially as and for the purpose set forth.

16. In a meter such as described and in combination with the oscillating and reciprocating piston provided with a segmental channel having a wing or partition located therein, a plate bridging the peripheral opening of the segmental channel of the piston, and adapted to move longitudinally with said piston but held stationary against oscillating movement during the oscillation of the piston, substantially as and for the purposes set forth.

17. In a meter such as described, a casing provided with inlet and outlet passages, a piston located within the casing and adapted to oscillate and reciprocate therein and provided with a segmental peripherally-open channel having a wing or partition located therein; a plate bridging the peripheral opening of the segmental channel and adapted for radial movement, means on one side of the casing for admitting liquid under pressure between the piston, and the casing, and between the bridge-plate and the casing, and means on the opposite side of the casing to prevent the escape of the liquid between the bridge-plate and the casing and between the piston and casing, whereby the several parts are held in predetermined relation by hydrostatic pressure substantially as hereinbefore set forth.

18. In a meter such as described, the piston provided with the segmental channel, peripheral recesses of predetermined area each side of the segmental channel, said recesses in communication with the liquid under pressure surrounding the piston, and plate bridging the segmental channel of the piston, whereby the pressure exerted upon the interior and exterior surfaces of the bridge-plate may be accurately adjusted to produce only such preponderance in external pressure as is required to keep said plate in proper water-tight and working relation with the piston, substantially as hereinbefore set forth.

19. In a liquid-meter, in combination with the casing having inlet and outlet passages, and a piston located within the casing and provided with inlet and exhaust ports, a cut-off interposed between the inlet-passage of the casing and the piston and provided with one or more channels communicating with the inlet-passage and a space between the casing and said cut-off, and a cut-off on the opposite side having the space between the same and the casing sealed against communication with the exhaust-passage of the casing, whereby the cut-offs are held in proper contact with the piston by hydrostatic pressure substantially as hereinbefore set forth.

In testimony whereof I affix my signature in presence of two witnesses.

JAMES C. ANDERSON.

Witnesses:
JNO. J. HARROWER,
D. G. STUART.